C. E. COLE.
PIPE CONNECTION.
APPLICATION FILED DEC. 5, 1917.

1,307,537.

Patented June 24, 1919.

Witness
J. Gordon Sparlen

Inventor
C. E. Cole

By
Attorney

UNITED STATES PATENT OFFICE.

CLIFFORD ELBRIDGE COLE, OF BIRMINGHAM, ALABAMA.

PIPE CONNECTION.

1,307,537.  Specification of Letters Patent.  Patented June 24, 1919.

Application filed December 5, 1917. Serial No. 205,590.

*To all whom it may concern:*

Be it known that I, CLIFFORD E. COLE, a citizen of the United States of America, residing at Birmingham, in the county of Jefferson and State of Alabama, have invented certain new and useful Improvements in Pipe Connections, of which the following is a specification.

My invention relates to a simple and convenient metal connection for coupling a lead or like soft metal pipe to an iron or hard metal pipe without requiring the wiping of a joint or the provision of a washer to insure a tight joint.

My invention is not intended as a union connection but has for its purpose more to take the place of wiped joints and to facilitate the screw connection of lead and iron pipes.

I have found after long use with the pipe couplings now on the market that they fail to obtain the most satisfactory joint with the lead pipe by reason of the fact that the pipe is not engaged and positively acted on by screw threads on the tapering inner and outer members of the connection, which threads should correspond with the pitch of the threads connecting the two members together so that as the latter are screwed home the pipe will be drawn between them so as to force its inner spread end into the joint in such manner as to take the place of the washer while the threads of the members are left embedded in the inner and outer walls of the lead pipe. This arrangement insures a strong, non-leaking joint in which it is unnecessary to use a washer and which can be readily applied to take the place of the present expensive wiped joints.

As illustrative of the preferred embodiment of my invention, reference is made to the accompanying drawings, in which:—

Similar reference numerals refer to similar parts throughout the drawings.

Figure 1:
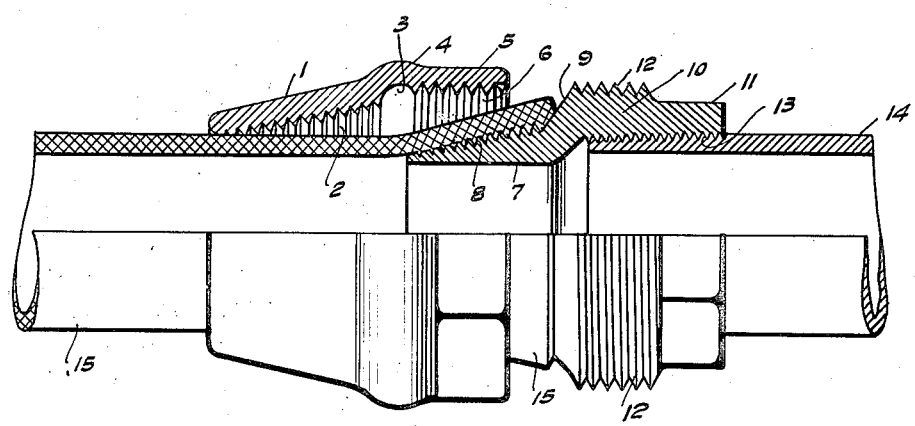
Figure 1 illustrates the connection after the inner member has been screwed into the end of the lead pipe and the outer connection member is about to be moved into place preparatory to being screwed home on the inner member.

My improved connection comprises an outer member having a tapered body portion 1 with internal screw threads 2 extending from its smaller end to the near wall of an annular recess 3 formed in an enlargement 4 surrounding the member. Beyond the recess 3 the member is provided with an extension 5, the outer surface of which is adapted for engagement with a wrench and the cylindrical interior surface of which is provided with threads 6 of the same pitch as the threads 2 but of uniform diameter, whereas the threads 2 increase in diameter as they depart from the small end of the member.

The inner member of the coupling comprises a taper extension 7 having threads 8 on its exterior surface corresponding in pitch and variation in diameter with the threads 2. The taper of the portions 1 and 7 of the members correspond. The threads 8 terminate at an annular inclined shoulder or abutment 9 beyond which the member is provided with an extension 10 having at its outer end a portion 11 which is adapted for engagement with a wrench and between the shoulder 9 and the portion 11 I provide external threads 12 corresponding in pitch and diameter with the threads 6. This extension 10 is internally threaded at 13 so that the iron or hard metal pipe 14 can be screwed thereinto.

Figure 2:
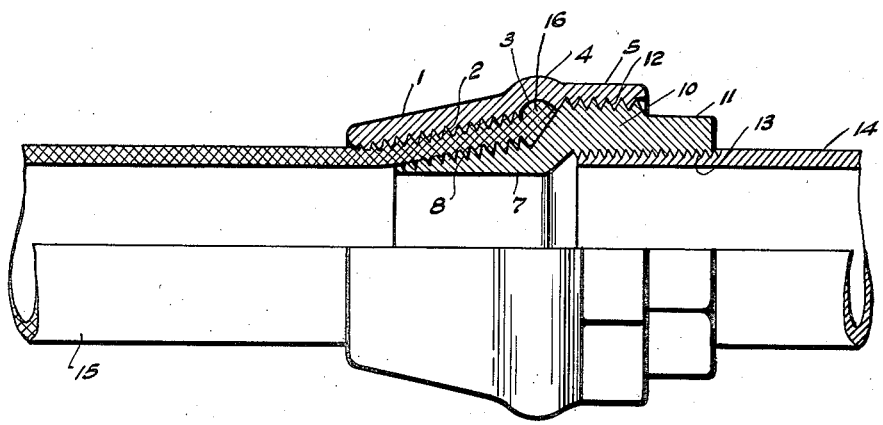
Fig. 2 is a view partially in section and partially in elevation showing the joint completed.

In operation, the taper threaded extension 7 of the inner member is screwed into the end of the pipe 15 which is made of lead or any soft pliable material. As the taper end 7 is forced into the pipe its threads screw into the inner surface and cause the pipe to spread as it rides up on the taper until it rides up on the annular shoulder 9. Before this is done, however, the outer connection member is slipped onto the pipe 15 and after the inner member has been screwed home in the manner described, the outer member is slipped to the right (see Fig. 1), until its threads 6 will mesh with the threads 12 on the inner member. Two wrenches are used, one engaging the portion 5 of the outer member and the other engaging the portion 11 of the inner member and as the inner member is held and the outer member is screwed on, the threads 2 on the latter begin to take effect on the flaring outer surface of the pipe 15 surrounding the taper extension 7 of the inner member and as the screwing proceeds the taper surfaces of the members are drawn closer and closer together compressing the lead pipe between them to the point of maximum compression. The surplus metal lying on the shoulder 9 is forced into the annular groove 3 so as to form a packing or washer 16, as indicated in Fig. 2, which also gives additional holding strength to the joint. It being noted that the threads 2, 6, 8 and 12 are all of the same pitch, there will be no stripping or shearing of the pipe 15 while the coupling is being made, the pipe material being compressed as it were bodily into the joint to seal it while the threads 2 and 8 are left fully embedded in the interior and exterior surfaces of the spread end of the pipe 15. This gives a joint not only leak proof but of maximum strength due to the gripping action of the threads 2 and 8 and the holding action of the integral packing ring 16, and moreover it is a joint which can be opened up as the inner member can be unscrewed from the outer member.

Having thus described my invention, what I claim as new and desire to secure by Letters Patent, is:—

In a pipe connection of the character described, an inner joint member having one end tapered and externally threaded, an outer member having a corresponding end tapered and internally threaded, said members having enlarged threaded body portions adapted to screw together and draw their tapered portions into position to compress a pipe of pliable material between them, the said threads on said members being all of the same pitch, means to connect a pipe to the outer end of the inner member, and an annular beveled shoulder arranged on the inner member between its threaded portions and facing toward its taper end, said outer member having a circumferential recess of uniform width and of substantial depth between its threaded portions and adapted to assume position over but spaced from said beveled shoulder when the connection is in assembled position, the inner member being adapted to project sufficiently beyond the outer member to present a wrench grip, substantially as described.

In testimony whereof I affix my signature.

CLIFFORD ELBRIDGE COLE.

Witness:
  NOMIE WELSH.